United States Patent
Byun et al.

(10) Patent No.: US 10,367,186 B2
(45) Date of Patent: Jul. 30, 2019

(54) SECONDARY BATTERY INCLUDING AN INSULATING MEMBER

(71) Applicant: SAMSUNG SDI CO., LTD., Yongin-si, Gyeonggi-do (KR)

(72) Inventors: Sangwon Byun, Yongin-si (KR); Sooseok Choi, Yongin-si (KR); Hyungsik Kim, Yongin-si (KR); Jeongwon Oh, Yongin-si (KR); Yongshik Hwang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 855 days.

(21) Appl. No.: 13/922,162

(22) Filed: Jun. 19, 2013

(65) Prior Publication Data

US 2014/0205897 A1    Jul. 24, 2014

Related U.S. Application Data

(66) Substitute for application No. 61/754,468, filed on Jan. 18, 2013.

(51) Int. Cl.
*H01M 2/30* (2006.01)
*H01M 2/04* (2006.01)
*H01M 2/06* (2006.01)

(52) U.S. Cl.
CPC ........... *H01M 2/30* (2013.01); *H01M 2/0426* (2013.01); *H01M 2/06* (2013.01)

(58) Field of Classification Search
CPC ......... H01M 2/0426; H01M 2/06; H01M 2/30
See application file for complete search history.

(56) References Cited

U.S. PATENT DOCUMENTS

| | | | |
|---|---|---|---|
| 2005/0238930 A1 | 10/2005 | Yoshida et al. | |
| 2011/0183167 A1* | 7/2011 | Moon | H01M 2/34 429/62 |
| 2011/0183198 A1* | 7/2011 | Byun | H01M 2/0456 429/185 |
| 2012/0058388 A1* | 3/2012 | Kim | H01M 2/305 429/179 |

(Continued)

FOREIGN PATENT DOCUMENTS

| | | |
|---|---|---|
| CN | 102487135 A | 6/2012 |
| EP | 2 355 210 A1 | 8/2011 |

(Continued)

OTHER PUBLICATIONS

Patent Abstracts of Japan and Machine English Translation of JP 2000-315482 (7 sheets).

(Continued)

*Primary Examiner* — Barbara L Gilliam
*Assistant Examiner* — Adam A Arciero
(74) *Attorney, Agent, or Firm* — Lewis Roca Rothgerber Christie LLP

(57) ABSTRACT

A secondary battery including an electrode assembly; a case containing the electrode assembly; a cap plate sealing an opening of the case; a collector terminal electrically connected to the electrode assembly and protruding through the cap plate; a coupling plate on the cap plate; an insulating member on at least one area of the coupling plate; and a terminal plate on the coupling plate and coupled to the collector terminal.

20 Claims, 7 Drawing Sheets

(56) References Cited

U.S. PATENT DOCUMENTS

2012/0141845 A1    6/2012  Byun et al.

FOREIGN PATENT DOCUMENTS

| EP | 2 410 595 A1 | 1/2012 |
|---|---|---|
| JP | 11-154504 | 6/1999 |
| JP | 11-154505 | 6/1999 |
| JP | 2000-315482 | 11/2000 |
| JP | 2005-44626 A | 2/2005 |
| JP | 2005-166584 A | 6/2005 |
| JP | 2008-186591 A | 8/2008 |
| JP | 2010-027546 | 2/2010 |
| JP | 2012-119303 A | 6/2012 |
| KR | 10-2007-0041122 | 4/2007 |
| KR | 10-2012-0060724 A | 6/2012 |

OTHER PUBLICATIONS

Patent Abstracts of Japan and Machine English Translation of JP 2010-027546 (13 sheets).
EPO Search Report dated Apr. 9, 2014, for corresponding European Patent application 13176078.7, (4 pages).
SIPO Office Action, with English translation, dated Mar. 1, 2017, for corresponding Chinese Patent Application No. 201310581336.7 (17 pages).
SIPO Office Action dated Mar. 1, 2017, for corresponding Chinese Patent Application No. 201310581336.7 (17 pages).
JPO Office Action dated Oct. 30, 2017, for corresponding Japanese Patent Application No. 2014-007507 (8 pages).

\* cited by examiner

SECONDARY BATTERY INCLUDING AN INSULATING MEMBER

CROSS-REFERENCE TO RELATED APPLICATION

This application claims priority to and the benefit of U.S. Provisional Application No. 61/754,468, filed on Jan. 18, 2013 in the U.S. Patent and Trademark Office, the entire content of which is incorporated herein by reference.

BACKGROUND

1. Field

Aspects of embodiments of the present invention relate to a secondary battery and an assembling method thereof.

2. Description of the Related Art

Unlike primary batteries which cannot be recharged, secondary batteries can be repeatedly charged and discharged. Low-capacity secondary batteries, each including a single unit cell, are widely used in small portable electronic devices, such as mobile phones, camcorders, or the like. On the other hand, large-capacity secondary batteries, each including multiple battery cells, may be used as motor driving power sources, such as for electric scooters, hybrid electric vehicles, electric vehicles, or the like.

The secondary battery can be fabricated having various shapes, such as cylindrical and prismatic shapes. The secondary battery includes an electrode assembly formed of positive and negative electrodes and an insulating separator interposed between them, accommodating the electrode assembly in a case with an electrolyte, and installing a cap plate in the case. Positive and negative terminals are connected to the electrode assembly and are exposed or protruded to the outside through the cap plate.

SUMMARY

According to an aspect of embodiments of the present invention, a secondary battery has improved safety by reducing heat generated due to an electric short circuit between electrodes when a needle-shaped body, such as a nail, passes through the same.

According to one or more embodiments of the present invention, a secondary battery includes: an electrode assembly; a case containing the electrode assembly; a cap plate sealing an opening of the case; a collector terminal electrically connected to the electrode assembly and protruding through the cap plate; a coupling plate on the cap plate; an insulating member on at least one area of the coupling plate; and a terminal plate on the coupling plate and coupled to the collector terminal.

The coupling plate may be contacting and electrically connected between the cap plate and the terminal plate.

The insulating member may be on a surface of the coupling plate contacting the cap plate.

The insulating member may be formed directly on the coupling plate.

The insulating member may be formed directly on the cap plate.

The insulating member may be formed directly on the terminal plate.

The coupling plate may include a plate, and the insulating member may be adjacent and coupled to the plate.

The insulating member may include an electrically insulating material.

The coupling plate may have a through hole formed therethrough, and the collector terminal may pass through the through hole.

The insulating member may extend on a surface of the coupling plate between the through hole and a lateral edge of the coupling plate.

The insulating member may extend on a surface of the coupling plate between the through hole and a first corner portion of the coupling plate.

The cap plate may have a recess, and the coupling plate may include a protrusion received in the recess and protruding from a second corner portion of the coupling plate spaced apart from the first corner portion.

The insulating member may surround the through hole on a surface of the coupling plate.

The insulating member may have a substantially circular shape and may be substantially concentric with the through hole.

The insulating member may be coated on the coupling plate.

The insulating member may be on a surface of the coupling plate contacting the terminal plate.

The secondary battery may further include: another collector terminal electrically connected to the electrode assembly and protruding through the cap plate; another terminal plate coupled to the another collector terminal; and an insulation plate between the cap plate and the another terminal plate.

The insulating member may be on a portion of one surface of the coupling plate and not be on another portion of the one surface. The one surface of the coupling plate may contact one of the cap plate or the terminal plate, and the insulating member may not be on another surface of the coupling plate opposite the one surface and contacting the other of the cap plate or the terminal plate.

The insulating member may be on at least one area of the coupling plate contacting the cap plate and at least one area of the coupling plate contacting the terminal plate.

According to one or more embodiments of the present invention, a secondary battery includes: a case accommodating an electrode assembly in an inner space thereof; a cap plate coupled to the case and sealing the case; a collector plate coupled to the electrode assembly; a collector terminal coupled to the collector plate and protruding to an upper portion of the cap plate; a fastening plate positioned on the cap plate; and a terminal plate formed on the fastening plate and coupled to the collector terminal, and an insulating layer is formed on at least one surface of the fastening plate.

The insulating layer may be formed on a surface on which the fastening plate makes contact with the cap plate or a surface on which the fastening plate makes contact with the terminal plate.

The insulating layer may be provided separately from the fastening plate to then be coupled to the fastening plate or may be directly formed on the fastening plate by coating.

The insulating layer may be formed to face a long side of the fastening plate about a through hole through which the collector terminal formed in the fastening plate passes.

The insulating layer may be formed to face an edge of the fastening plate about a through hole through which the collector terminal formed in the fastening plate passes.

The insulating layer may be formed to surround a through hole through which the collector terminal formed in the fastening plate passes.

The insulating layer may be formed in a concentric circle shape to surround a through hole through which the collector terminal formed in the fastening plate passes.

According to an aspect of embodiments of the present invention, in a secondary battery, a fastening plate is formed between a terminal plate forming a first terminal and a cap plate, and a current path is limited by forming an insulating layer on an area of the fastening plate, thereby ensuring or increasing safety while reducing heat generated by reducing a current amount even if an electric short circuit is generated at the secondary battery due to penetration of a needle-shaped body, such as a nail. According to another aspect of embodiments of the present invention, a method of assembling the above-described secondary battery is provided.

BRIEF DESCRIPTION OF THE DRAWINGS

The accompanying drawings, together with the specification, illustrate some exemplary embodiments of the present invention, and, together with the description, serve to explain principles and aspects of the present invention.

Figure 1:
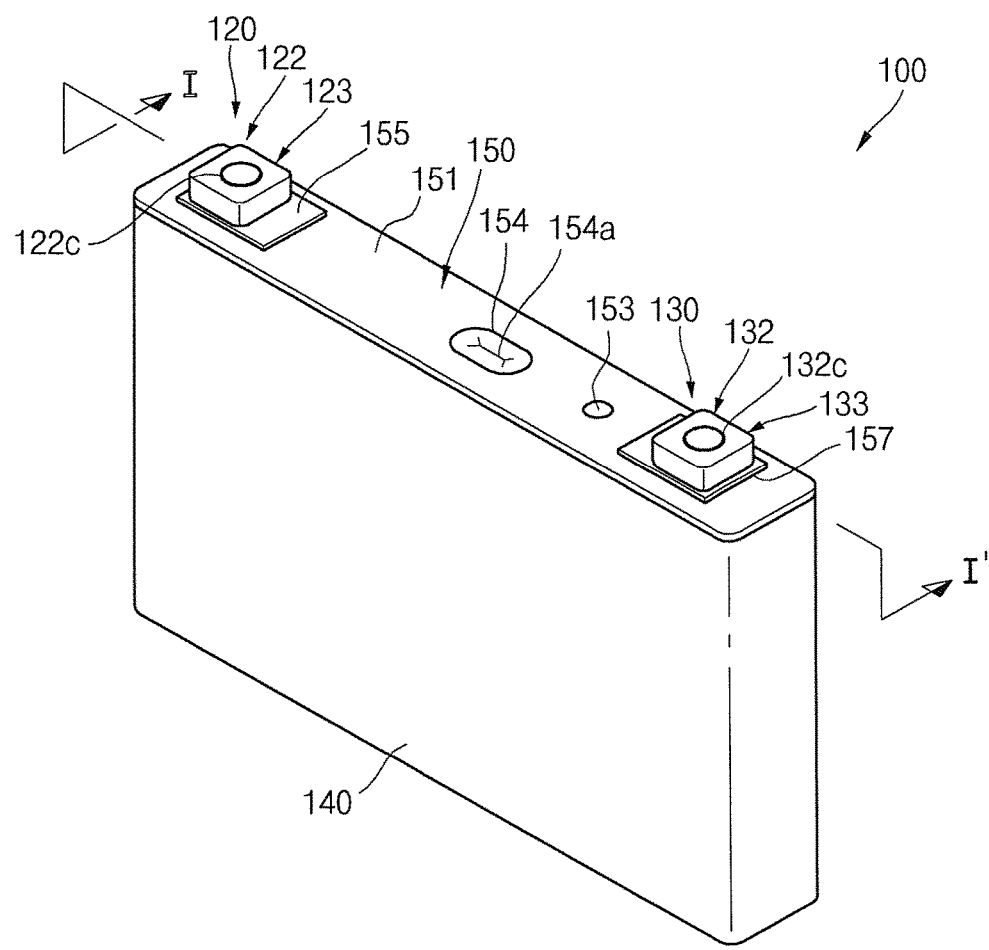
FIG. 1 is a perspective view of a secondary battery according to an embodiment of the present invention.

| Description of Reference Numerals Indicating Some Elements in the Drawings | |
|---|---|
| 100: Secondary battery | 110: Electrode assembly |
| 120: First terminal | 121: First collector plate |
| 122: First collector terminal | 123: First terminal plate |
| 130: Second terminal | 131: Second collector plate |
| 132: Second collector terminal | 133: Second terminal plate |
| 140: Case | 150: Cap assembly |
| 151: Cap plate | 152: Gasket |
| 155, 255, 355: Coupling plate | 156, 256, 356: Insulating member |
| 157: Insulation plate | 158: Insulator |

DETAILED DESCRIPTION

In the following detailed description, certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

A configuration of a secondary battery according to an embodiment of the present invention is described below.

Figure 2:
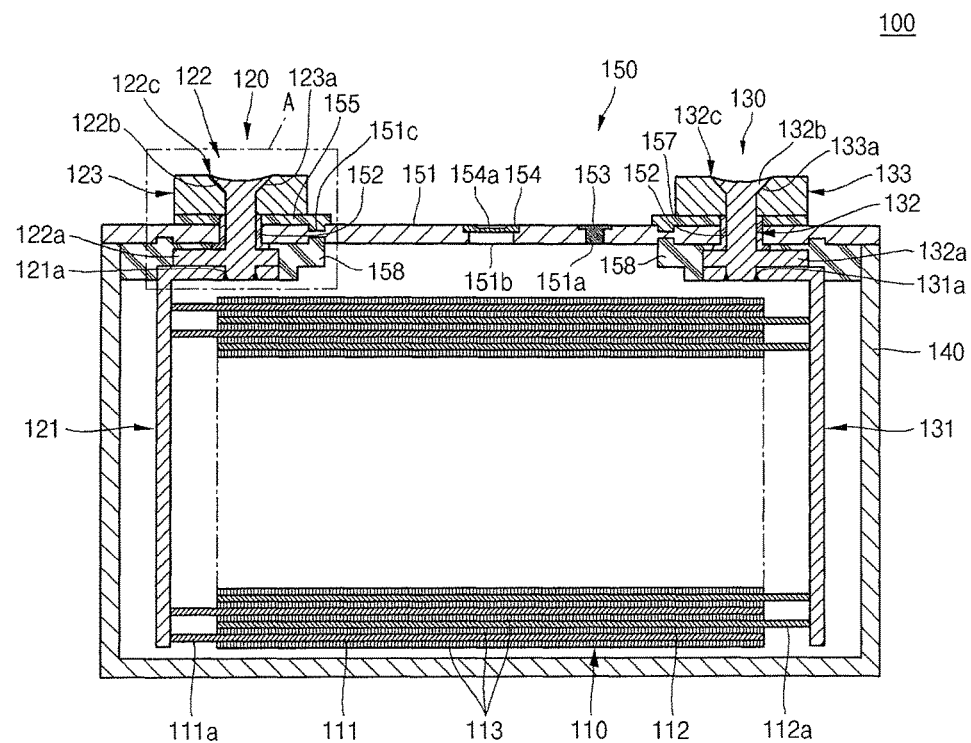
FIG. 2 is a cross-sectional view of the secondary battery of FIG. 1.
Figure 3:
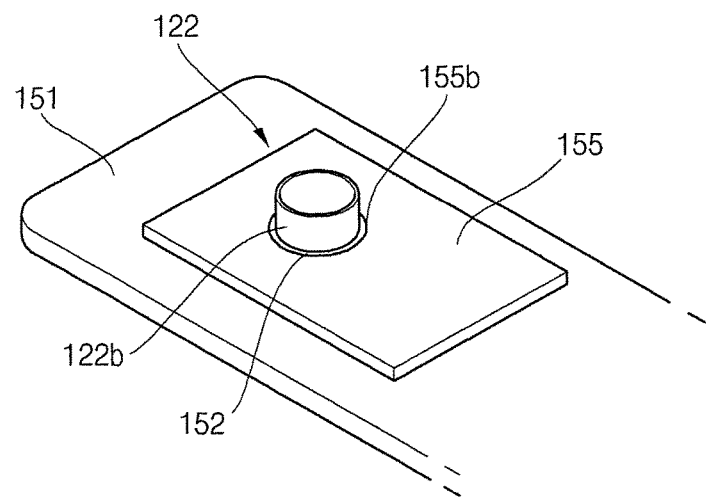
FIG. 3 is a perspective view of a coupling plate coupled to a cap plate of a secondary battery, according to an embodiment of the present invention.
Figure 4:
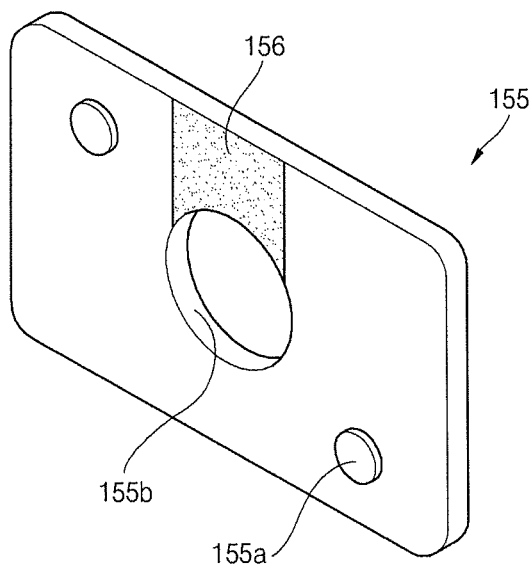
FIG. 4 is a perspective view of a coupling plate of a secondary battery according to an embodiment of the present invention.

FIG. 1 is a perspective view of a secondary battery according to an embodiment of the present invention; FIG. 2 is a cross-sectional view of the secondary battery of FIG. 1; FIG. 3 is a perspective view of a coupling plate coupled to a cap plate in the secondary battery according to an embodiment of the present invention; and FIG. 4 is a perspective view of a coupling plate of a secondary battery according to an embodiment of the present invention, illustrating a surface which makes contact with a cap plate.

Referring to FIGS. 1 to 4, a secondary battery 100 according to an embodiment of the present invention includes an electrode assembly 110, a first terminal 120, or first current collector, a second terminal 130, or second current collector, a case 140, and a cap assembly 150.

The electrode assembly 110 may be formed by winding a stack of a first electrode plate 111, a separator 113, and a second electrode plate 112, which are formed of thin plates or layers, or by stacking the first electrode plate 111, the separator 113, and the second electrode plate 112. In one embodiment, the first electrode plate 111 may serve as a positive electrode, and the second electrode plate 112 may serve as a negative electrode. However, in another embodiment, the first electrode plate 111 and the second electrode plate 112 may be reversely disposed to have opposite polarities to those described above.

The first electrode plate 111, in one embodiment, is formed by coating a first electrode active material, e.g., a transition metal oxide, on a first electrode current collector made of a metallic foil, e.g., an aluminum foil, and includes a first electrode non-coating portion 111a that is not coated with the first active material. The first electrode non-coating portion 111a provides a path of the current flow between the first electrode plate 111 and external portions of the secondary battery 100. However, a material of the first electrode plate 111 according to embodiments of the present invention is not limited to that listed herein.

The second electrode plate 112, in one embodiment, is formed by coating a second electrode active material, e.g., graphite or carbon, on a second electrode current collector made of a metallic foil, e.g., a copper or nickel foil, and includes a second electrode non-coating portion 112a that is not coated with the second active material. The second electrode non-coating portion 112a provides a path of the current flow between the second electrode plate 112 and external portions of the secondary battery 100. However, a material of the second electrode plate 112 according to embodiments of the present invention is not limited to that listed herein.

The separator 113, located between the first electrode plate 111 and the second electrode plate 112, interrupts or prevents an electrical short circuit therebetween, and enables movement of lithium ions. The separator 113 may be formed of a porous membrane using polyethylene (PE), polypropylene (PP), or a composite film thereof. However, a material of the separator 113 according to embodiments of the present invention is not limited to that listed herein.

The first terminal 120 and the second terminal 130 electrically connected to the first electrode plate 111 and the second electrode plate 112, respectively, are coupled to opposite ends of the electrode assembly 110.

The electrode assembly 110 is substantially accommodated in the case 140 with an electrolyte. The electrolyte may include an organic solvent, such as ethylene carbonate (EC), propylene carbonate (PC), diethyl carbonate (DEC), ethyl methyl carbonate (EMC), or dimethyl carbonate (DMC), and a lithium salt, such as $LiPF_6$ or $LiBF_4$. The electrolyte may be in a liquid, solid, or gel phase.

The first terminal 120 is made of a metal or an equivalent thereof and is electrically connected to the first electrode plate 111. The first terminal 120, in one embodiment, includes a first collector plate 121, a first collector terminal 122, and a first terminal plate 123.

The first collector plate 121 makes contact with the first electrode non-coating portion 111a protruding to one end of the electrode assembly 110 and is coupled thereto. The first collector plate 121, in one embodiment, may be coupled to the first electrode non-coating portion 111a by welding. The first collector plate 121 is formed to have a vertical region formed along the first electrode non-coating portion 111a and a horizontal region substantially perpendicular with respect to the vertical region, and a terminal hole 121a is formed in the horizontal region. A portion of the first collector terminal 122 is inserted into and coupled to the first collector plate 121 in the terminal hole 121a. In one embodiment, the first collector plate 121 is made of aluminum or an aluminum alloy. However, a material of the first collector plate 121 according to other embodiments of the present invention is not limited thereto.

The first collector terminal 122 passes through a cap plate 151 and upwardly protrudes and extends by a length (e.g., a predetermined length) and is electrically connected to the first collector plate 121 at a lower side of the cap plate 151. In one embodiment, the first collector terminal 122 is made of aluminum or an aluminum alloy. However, a material of the first collector terminal 122 according to other embodiments of the present invention is not limited thereto. The first collector terminal 122, in one embodiment, includes a flange 122a extending in a horizontal direction along the first collector plate 121, a rivet 122b upwardly protruding and coupled to the first terminal plate 123, and a coupling portion 122c formed along the edge of the rivet 122b.

The flange 122a is formed in the horizontal direction along the first collector plate 121. In addition, the flange 122a vertically protrudes from a region of the first collector terminal 122 to be inserted into the terminal hole 121a of the first collector plate 121. In one embodiment, welding is performed on a peripheral portion of the terminal hole 121a, thereby coupling the first collector terminal 122 to the first collector plate 121.

The rivet 122b is formed to upwardly protrude from the flange 122a. The rivet 122b is riveted while passing through the first terminal plate 123, and mechanically and electrically couples the first collector terminal 122 to the first terminal plate 123. In one embodiment, welding is performed on a peripheral portion of the rivet 122b to form a coupling portion 122c, thereby maintaining the rivet 122b in a more tightly coupled state.

The first terminal plate 123, in one embodiment, is made of aluminum or an aluminum alloy. In one embodiment, the first terminal plate 123 has a sloping surface 123a recessed from an upper portion of the first terminal plate 123. When the rivet 122b of the first collector terminal 122 is riveted, it is easily compressed along the sloping surface 123a, thereby increasing a coupling area between the first terminal plate 123 and the rivet 122b by a surface contact. Accordingly, the first terminal plate 123 may be mechanically and electrically connected to the first collector terminal 122.

As will be described in further detail later herein, a coupling plate 155, or fastening plate, is formed between the first terminal plate 123 and the cap plate 150. Therefore, the first terminal plate 123 and the cap plate 150 have a same polarity, e.g., a first polarity. An amount of current flowing between the first terminal plate 123 and the cap plate 150 is controlled according to a location and area of an insulating member 156 on at least one area of the coupling plate 155, thereby reducing heat generated when an electrical short circuit occurs between electrodes, such as due to penetration of a needle-shaped body.

The second terminal 130, in one embodiment, has a shape corresponding to that of the first terminal 120. The second terminal 130 is electrically connected to the second electrode plate 112 of the electrode assembly 110. The second terminal 130 may include a second collector plate 131, a second collector terminal 132, and a second terminal plate 133.

The second collector plate 131 may be made of copper or a copper alloy, but the material of the second collector plate 131 is not limited thereto according to embodiments of the present invention. The second collector plate 131, in one embodiment, is substantially "L"-shaped and is coupled to the second electrode plate 112 of the electrode assembly 110. In addition, the second collector plate 131 includes a terminal hole 131a, and the second collector terminal 132 is inserted into the terminal hole 131a to be welded to the second collector plate 131 therein.

The second collector terminal 132, in one embodiment, is connected to the second collector plate 131 to protrude to an upper portion of the cap plate 151, and includes a flange 132a, a rivet 132b, and a coupling portion 132c corresponding to the first collector terminal 122.

The second terminal plate 133 is coupled to the second collector terminal 132 and includes a sloping surface 133a, by which a coupling force between the second collector terminal 132 and the rivet 132b. The second terminal plate 133 is coupled to the cap plate 151 through an insulation plate 157. Therefore, the second terminal plate 133 having a second polarity is electrically disconnected from the cap plate 151 having the first polarity, thereby preventing or substantially preventing an electrical short circuit between electrodes during normal operation.

The case 140, in one embodiment, is made of a conductive metal such as aluminum, an aluminum alloy, or nickel-plated steel and is substantially shaped as a hexahedron having an opening into which the electrode assembly 110, the first terminal 120, and the second terminal 130 are inserted and placed. While FIG. 2 shows the case 140 and the cap plate 151 in an assembled state, and the opening is not shown, a peripheral portion of the case 140 contacting the cap plate 151 may be a substantially open portion. In the secondary battery 100 according to an embodiment of the present invention, the first terminal 120 is electrically connected to the cap plate 151 and the case 140, such that the case 140 has a same polarity as the first terminal 120, e.g., a first polarity. In one embodiment, the inner surface of the case 140 is insulated, and the second non-coating portion 112a of the electrode assembly 110 having the second polarity and the second terminal 130 may be electrically isolated from each other even when they come into contact with each other due to movement, thereby preventing or substantially preventing an electrical short circuit from occurring during normal operation.

The cap assembly 150 is coupled to the case 140. In one embodiment, the cap assembly 150 includes the cap plate 151, the coupling plate 155, the insulating member 156, and the insulation plate 157. In addition, the cap assembly 150 may further include a gasket 152, a plug 153, a safety vent 154, and an insulator 158.

The cap plate 151 seals the opening of the case 140 and may be made of the same material as the case 140. In one embodiment, for example, the cap plate 151 may be coupled to the case 140 by laser welding. In one embodiment, the cap plate 151 is electrically connected to the first terminal 130, and the cap plate 151 and the case 140 have a same polarity, e.g., a first polarity.

The seal gasket 152 is formed between each of the first collector terminal 122 and the second collector terminal 132 and the cap plate 151 using an insulating material, and seals portions between each of the first collector terminal 122 and the second collector terminal 132 and the cap plate 151. The seal gasket 152 prevents or substantially prevents external moisture from penetrating into the secondary battery 100 or prevents or substantially prevents an electrolyte accommodated in the secondary battery 100 from leaking outside.

The plug 153 seals an electrolyte injection hole 151a of the cap plate 151. The safety vent 154 is installed in a vent hole 151b of the cap plate 151, and a notch 154a may be formed in the safety vent 154 to be opened at a reference pressure (e.g., a predetermined pressure).

The coupling plate 155 is arranged between the cap plate 151 and the first terminal plate 123. The coupling plate 155 may be made of a same material as the cap plate 151, such as aluminum or an aluminum alloy, but the material of the coupling plate 155 is not limited thereto according to embodiments of the present invention.

In one embodiment, the coupling plate 155 includes a coupling protrusion 155a, and a coupling groove 151c is formed in the cap plate 151 to be located to correspond to the coupling groove 151c. Therefore, when the coupling plate 155 is coupled to the cap plate 151, the coupling protrusion 155a is coupled to the coupling groove 151c to be inserted therein. Therefore, the coupling plate 155 is stably coupled to the cap plate 151, thereby preventing or substantially preventing the coupling plate 155 from moving during manufacture or use. The first collector terminal 122 and the gasket 152 pass through a through hole 155b formed in the coupling plate 155, such that the first collector terminal 122 may be coupled to the first terminal plate 123.

The coupling plate 155 may have a same polarity as the first terminal plate 123 and the cap plate 151, e.g., a first polarity, and provides a path of current flow between the coupling plate 155 and each of the first terminal plate 123 and the cap plate 151.

Figure 11:
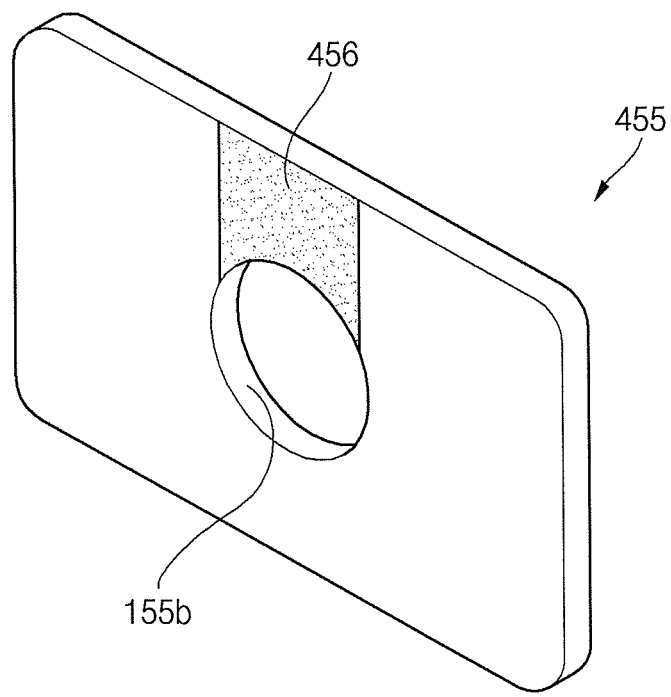
FIG. 11 is a perspective view of a coupling plate of a secondary battery according to another embodiment of the present invention.

The insulating member 156, or insulating layer, is formed on one surface of the coupling plate 155, or is on at least one area of the coupling plate 155. In one embodiment, as shown in FIG. 4, the insulating member 156 may be formed on a first surface on which the coupling plate 155 makes contact with the cap plate 151. In another embodiment, as shown in FIG. 11, the insulating member 456 may be formed on a second surface on which the coupling plate 455 makes contact with the first terminal plate 123, the second surface opposite to the first surface.

The insulating member 156, in one embodiment, may be formed extending to face a long side of the coupling plate 155 about the through hole 155b of the coupling plate 155. That is, as shown in FIG. 4, the insulating member 156 may extend from an edge of one side of the through hole 155b to a long side edge of the coupling plate 155.

The insulating member 156 is made of an electrically insulating material and controls a cross-sectional area of the coupling plate 155 and the cap plate 151 which contact each other and through which the current flows. That is, the insulating member 156 increases a resistance in the path of current flow and impedes the flow of current. Therefore, if an electrical short circuit occurs, such as by a needle-shaped body passing through the case 140, and a large amount of current flows, the insulating member 156 may reduce the amount of current flowing between the coupling plate 155 and the cap plate 151. Therefore, the heat generated by the flow of current in an event of an electrical short circuit can be reduced, and safety can be ensured or improved.

Figure 12:
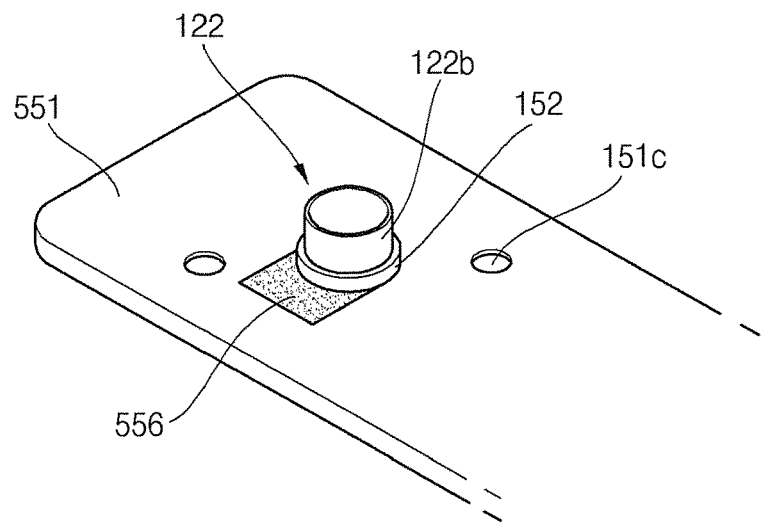
FIG. 12 is a perspective view of a cap plate of a secondary battery according to another embodiment of the present invention.
Figure 13:
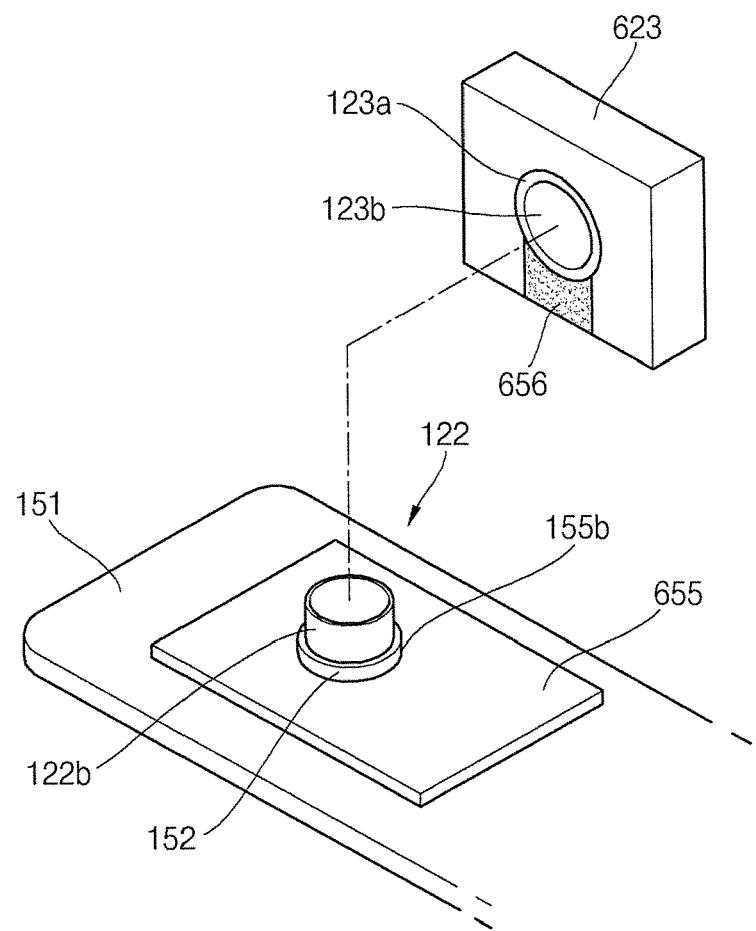
FIG. 13 is a perspective view of a terminal plate coupled to a coupling plate of a secondary battery according to another embodiment of the present invention.

In one embodiment, the insulating member 156 may be separately provided and then coupled to the coupling plate 155. In another embodiment, the insulating member 156 may be directly formed on the coupling plate 155, such as by coating. That is, the insulating member 156 may be an insulating layer, such as a coated layer. In one embodiment, as shown in FIG. 12, an insulating member 556 may be formed on (e.g., directly formed on) the cap plate 551 or, as shown in FIG. 13, an insulating member 656 may be formed on a first terminal plate 623, such as by coating, at a location contacting the coupling plates 155, 455 or 655.

The insulation plate 157 is formed between the second terminal plate 133 and the cap plate 151. The insulation plate 157 may be shaped to correspond to the coupling plate 155. However, the insulation plate 157 is formed using an electrically insulating material, and the second terminal plate 133 having a second polarity is electrically disconnected from the cap plate 151 having a first polarity, thereby preventing or substantially preventing an electrical short circuit from occurring between electrodes.

In one embodiment, the insulator 158 makes close contact with the cap plate 151. The insulator 158 may also make close contact with the gasket 152. The insulator 158, in one embodiment, closely contacts between the first terminal plate 123 and the second terminal plate 133 and the cap plate 151, thereby coupling the first terminal plate 123 and the second terminal plate 133 to the cap plate 151. The insulator 158 is formed between the second collector plate 131 and the cap plate 151 and between the case 140 and the second collector plate 131, thereby preventing or substantially preventing an unnecessary electrical short circuit.

As described above, in the secondary battery 100 according to an embodiment of the present invention, when the coupling plate 155 is formed between the terminal plate 123 forming the first terminal 120 and the cap plate 151, a current path is limited by forming the insulating member 156 on a surface or on at least one area of the coupling plate 155, where the coupling plate 155 makes contact with the cap plate 151, thereby ensuring or increasing safety while reducing heat generated by reducing a current amount even if an electrical short circuit is generated at the secondary battery, such as due to penetration of a needle-shaped body, such as a nail.

A method of assembling a secondary battery according to an embodiment of the present invention is described below.

FIGS. 5 to 8 illustrate (e.g., sequentially illustrate) a method of assembling a secondary battery, according to an embodiment of the present invention.

Figure 5:
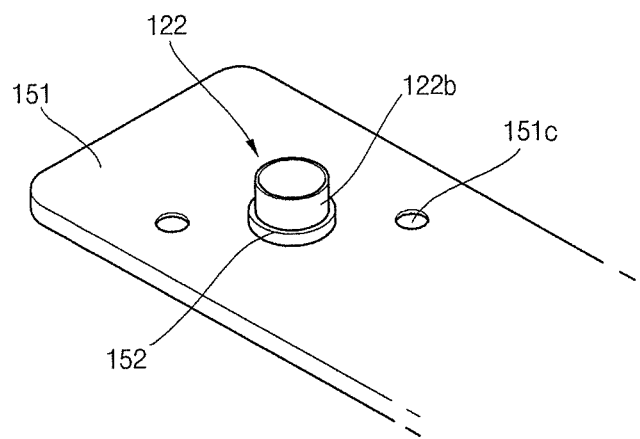
FIGS. 5 to 8 illustrate an assembling method of a secondary battery, according to an embodiment of the present invention.

Referring to FIG. 5, the first collector terminal 122 is coupled to the cap plate 151. The rivet 122b of the first collector terminal 122, together with the gasket 152, passes through the cap plate 151 and protrudes to be substantially perpendicular to a top surface of the cap plate 151. The rivet 122b may be electrically disconnected from the cap plate 151 by the gasket 152. In one embodiment, the coupling groove 151c is formed on a surface of the cap plate 151, and the coupling groove 151c is coupled to the coupling protrusion 155a formed on a bottom surface of the coupling plate 155.

Figure 6:
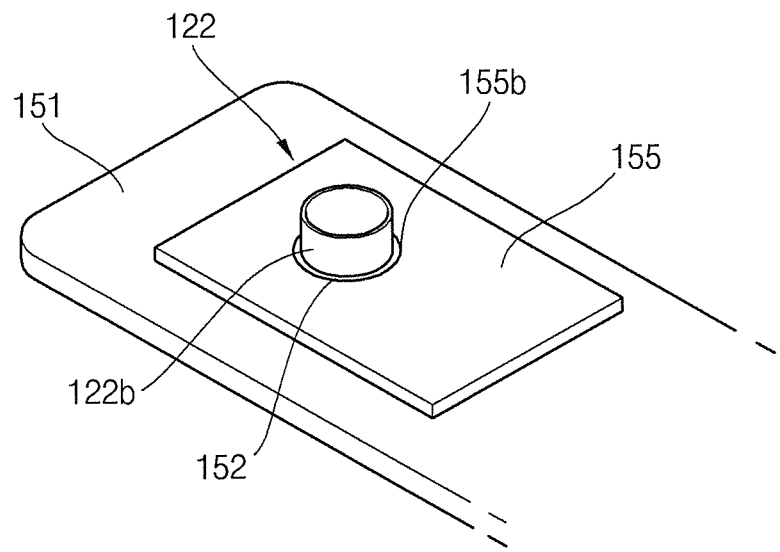

Referring to FIG. 6, the coupling plate 155 is coupled to the first collector terminal 122. The coupling protrusion 155a is formed in the coupling plate 155 and is coupled to the coupling groove 151c of the cap plate 151. Therefore, the coupling plate 155 may be fixed to the top surface of the cap plate 151 so as not to rotate about the first collector terminal 122.

In addition, as described above, the insulating member 156 may be formed on the first surface on which the coupling plate 155 makes contact with the cap plate 151. Therefore, an amount of the current flowing between the coupling plate 155 and the cap plate 151 may be reduced by the insulating member 156, thereby reducing the heat generated when an electrical short circuit occurs in the secondary battery.

Figure 7:
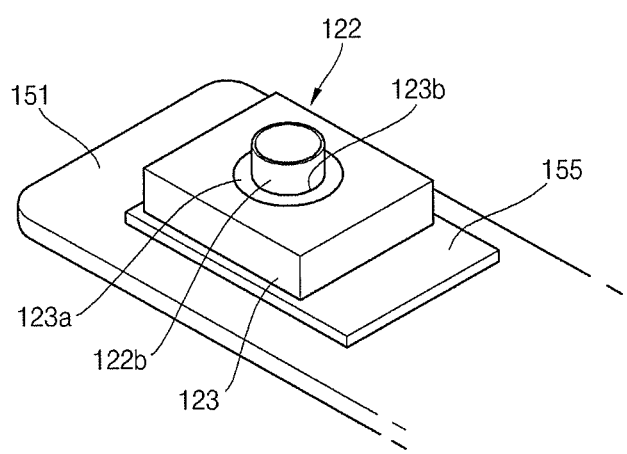

Referring to FIG. 7, the first terminal plate 123 is coupled to the first collector terminal 122. The first terminal plate 123 has a through hole 123b formed at a substantially central area and is coupled to the first collector terminal 122 while the first collector terminal 122 passes through the through hole 123b. The first terminal plate 123 makes close contact with the coupling plate 155. Therefore, the first terminal plate 123 is electrically connected to the cap plate 151 by the coupling plate 155.

Figure 8:
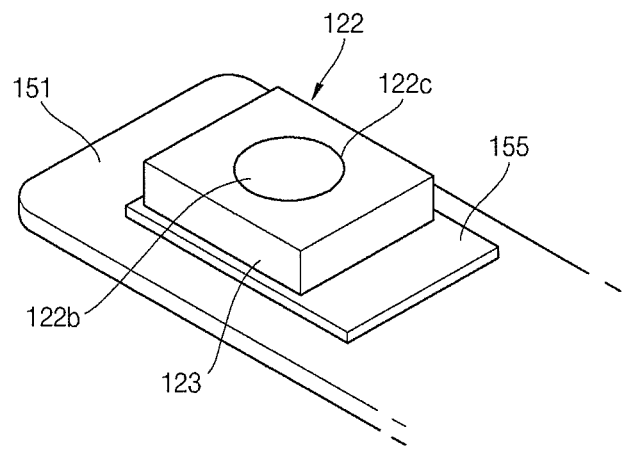

Referring to FIG. 8, the rivet 122b of the first collector terminal 122 is riveted by a riveting tool. In one embodiment, the rivet 122b is riveted along the sloping surface 123a of the first terminal plate 123, and the rivet 122b is formed inside a space formed by the sloping surface 123a of the first terminal plate 123. Therefore, the rivet 122b of the first collector terminal 122 is firmly fixed to the first terminal plate 123 mechanically and electrically.

In one embodiment, welding is performed along a boundary between the rivet 122b of the first collector terminal 122 and the first terminal plate 123, thereby forming the coupling portion 122c. As a result of riveting, the boundary between the rivet 122b and the first terminal plate 123 may be formed in a circular shape. In one embodiment, the welding may be performed along the boundary by circumferential welding. The coupling portion 122c formed by welding mechanically and electrically couples the rivet 122b to the first terminal plate 123 in an effective manner. As a result, the first collector terminal 122 having the rivet 122b is stably coupled to the first terminal plate 123.

In one embodiment, although not shown, riveting and welding may be performed between the second collector terminal 132 and the second terminal plate 133, thereby stably coupling the second collector terminal 132 to the second terminal plate 133. Further, the cap plate 151 may be coupled to the case 140 by welding, an electrolyte may be injected into the case 140 through the electrolyte injection hole 151a of the cap plate 151, and the electrolyte injection hole 151a may be closed using the plug 153.

A secondary battery according to another embodiment of the present invention is described below.

Figure 9:
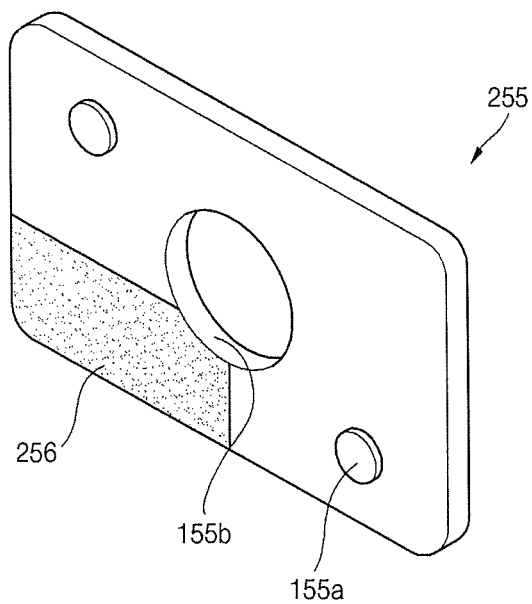
FIG. 9 is a perspective view of a coupling plate of a secondary battery according to another embodiment of the present invention.

FIG. 9 is a perspective view of a coupling plate of a secondary battery according to another embodiment of the present invention, illustrating a surface which makes contact with a cap plate.

Referring to FIG. 9, a secondary battery according to another embodiment of the present invention includes a coupling plate 255, or fastening plate, and an insulating member 256. The secondary battery according to another embodiment of the present invention is substantially the same as the secondary battery according to the previously described embodiment, except for configurations of the coupling plate 255 and the insulating member 256, and, therefore, the following description is directed to the coupling plate 255 and the insulating member 256.

The insulating member 256, in one embodiment, may be formed to extend toward one corner of the coupling plate 255 about the through hole 155b of the coupling plate 255. In one embodiment, the insulating member 256 may be formed to extend toward a corner of the coupling plate 255 in which the coupling protrusion 155a is not formed. In consideration of a step difference of the coupling protrusion 155a, when the insulating member 256 is formed at a region where the coupling protrusion 155a is not formed, the insulating member 256 may be stably coupled to the coupling plate 255 more easily.

In addition, in the secondary battery according to another embodiment of the present invention, a fastening area can be increased such that the insulating member 256 is disposed to face the corner of the coupling plate 255 where the coupling protrusion 155a is not formed, thereby reducing an amount of current flowing when an electrical short circuit occurs between the electrodes while reducing the heat generated.

A secondary battery according to another embodiment of the present invention is described below.

Figure 10:
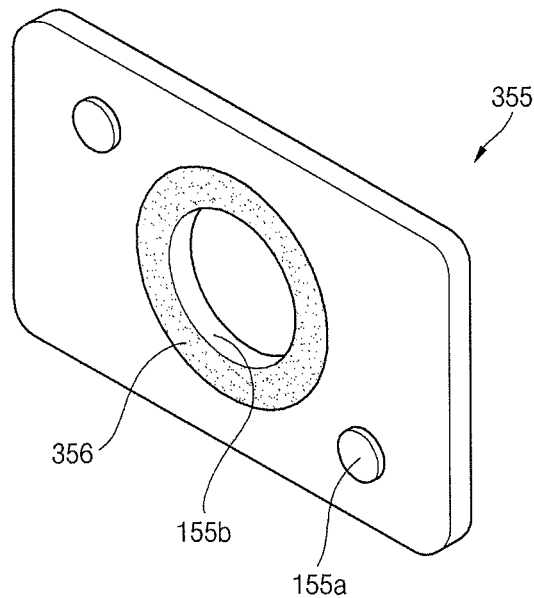
FIG. 10 is a perspective view of a coupling plate of a secondary battery according to another embodiment of the present invention.

FIG. 10 is a perspective view of a coupling plate of a secondary battery according to another embodiment of the present invention, illustrating a surface which makes contact with a cap plate.

Referring to FIG. 10, a secondary battery according to another embodiment of the present invention includes a coupling plate 355, or fastening plate, and an insulating member 356. The secondary battery according to another embodiment of the present invention may be substantially the same as the secondary battery according to the previously described embodiments, except for configurations of the coupling plate 355 and the insulating member 356, and, therefore, the following description is directed to the coupling plate 355 and the insulating member 356.

The insulating member 356, in one embodiment, may be formed to surround the through hole 155b of the coupling plate 355. In one embodiment, the insulating member 356 may be formed in a concentric circular shape about the through hole 155b. Therefore, the insulating member 356 may block the flow of current around the through hole 155b where a relatively large amount of current may flow, thereby more effectively blocking the flow of current.

Therefore, in the secondary battery according to another embodiment of the present invention, a current amount can be further reduced by forming the insulating member 356 around the through hole 155b of the coupling plate 355, and the heat generated in an event of an electrical short circuit can be effectively reduced.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A secondary battery comprising:
an electrode assembly comprising a first electrode and a second electrode;
a case containing the electrode assembly;
a cap plate sealing an opening of the case;

a collector terminal electrically connected to the first electrode of the electrode assembly and protruding through the cap plate to an outside of the case;

a coupling plate on the cap plate;

an insulating member on at least one area of the coupling plate; and a terminal plate on the coupling plate and coupled to the collector terminal at the outside of the case, the insulating member being between the terminal plate and an outer surface of the cap plate, wherein, in a normal operating state in which the first electrode and the second electrode are not short circuited, the terminal plate is electrically connected to the first electrode of the electrode assembly through the collector terminal and is electrically connected to the cap plate through at least a portion of the coupling plate that is in contact with the cap plate, and the second electrode of the electrode assembly is electrically insulated from the cap plate.

2. The secondary battery of claim 1, wherein the coupling plate is contacting and electrically connected between the cap plate and the terminal plate.

3. The secondary battery of claim 1, wherein the insulating member is on a surface of the coupling plate contacting the cap plate.

4. The secondary battery of claim 1, wherein the insulating member is formed directly on the coupling plate.

5. The secondary battery of claim 1, wherein the insulating member is formed directly on the cap plate.

6. The secondary battery of claim 1, wherein the insulating member is formed directly on the terminal plate.

7. The secondary battery of claim 1, wherein the coupling plate comprises a plate, and the insulating member is adjacent and coupled to the plate.

8. The secondary battery of claim 1, wherein the insulating member comprises an electrically insulating material.

9. The secondary battery of claim 1, wherein the coupling plate has a through hole formed therethrough, and the collector terminal passes through the through hole.

10. The secondary battery of claim 9, wherein the insulating member extends on a surface of the coupling plate between the through hole and a lateral edge of the coupling plate.

11. The secondary battery of claim 9, wherein the insulating member extends on a surface of the coupling plate between the through hole and a first corner portion of the coupling plate.

12. The secondary battery of claim 11, wherein the cap plate has a recess, and the coupling plate comprises a protrusion received in the recess and protruding from a second corner portion of the coupling plate spaced apart from the first corner portion.

13. The secondary battery of claim 9, wherein the insulating member surrounds the through hole on a surface of the coupling plate.

14. The secondary battery of claim 13, wherein the insulating member has a circular shape and is concentric with the through hole.

15. The secondary battery of claim 1, wherein the insulating member is coated on the coupling plate.

16. The secondary battery of claim 1, wherein the insulating member is on a surface of the coupling plate contacting the terminal plate.

17. The secondary battery of claim 1, further comprising:
   another collector terminal electrically connected to the second electrode of the electrode assembly and protruding through the cap plate;
   another terminal plate coupled to the another collector terminal; and
   an insulation plate between the cap plate and the another terminal plate.

18. The secondary battery of claim 1, wherein the insulating member is on a portion of one surface of the coupling plate and is not on another portion of the one surface.

19. The secondary battery of claim 18, wherein the one surface of the coupling plate contacts one of the cap plate or the terminal plate, and the insulating member is not on another surface of the coupling plate opposite the one surface and contacting the other of the cap plate or the terminal plate.

20. The secondary battery of claim 1, wherein the insulating member is on at least one area of the coupling plate contacting the cap plate and at least one area of the coupling plate contacting the terminal plate.

* * * * *